United States Patent [19]

Shimizu et al.

[11] Patent Number: 4,985,828
[45] Date of Patent: Jan. 15, 1991

[54] METHOD AND APPARATUS FOR GENERATING A REAL ADDRESS MULTIPLE VIRTUAL ADDRESS SPACES OF A STORAGE

[75] Inventors: Naohiko Shimizu; Hideo Sawamoto, both of Hadano, Japan

[73] Assignee: Hitachi, Ltd., Tokyo, Japan

[21] Appl. No.: 156,454

[22] Filed: Feb. 16, 1988

[30] Foreign Application Priority Data

Mar. 19, 1987 [JP] Japan ................... 62-65424

[51] Int. Cl.$^5$ ............................................. G06F 12/10
[52] U.S. Cl. .................... 364/200; 364/900; 364/256.3; 364/961.2; 364/246.6
[58] Field of Search ... 364/200 MS File, 900 MS File, 364/134

[56] References Cited

U.S. PATENT DOCUMENTS

| | | | |
|---|---|---|---|
| 4,004,278 | 1/1977 | Nagashima | 364/200 |
| 4,136,385 | 1/1979 | Gannon et al. | 364/200 |
| 4,326,248 | 4/1982 | Hinai et al. | 364/200 |
| 4,355,355 | 10/1982 | Butwell et al. | 364/200 |
| 4,521,846 | 6/1985 | Scalzi et al. | 364/200 |
| 4,758,951 | 7/1988 | Sznyter, III | 364/200 |
| 4,761,737 | 8/1988 | Duvall et al. | 364/200 |
| 4,812,969 | 3/1989 | Takagi et al. | 364/200 |
| 4,843,541 | 6/1989 | Bean et al. | 364/200 |

FOREIGN PATENT DOCUMENTS 60-48494 12/1984 Japan .
60-68443 4/1985 Japan .

Primary Examiner—Michael R. Fleming
Assistant Examiner—Gopal C. Ray
Attorney, Agent, or Firm—Antonelli, Terry, Stout & Kraus

[57] ABSTRACT

A multiple virtual space control in a multiple virtual storage system having an address translation table used to translate a logical address to a real address, a control register for holding a start address of the address translation table or a space identifier (hereinafter represented by address translation table start address) and an address translation buffer containing a pair of logical address and real address and an address translation table start address for translating a logical address to a real address, in order to update the content of the control register to switch the virtual space. A group identifier comprising a plurality of bits for identifying an area common to a group of virtual spaces is added to an entry of the address translation table, an entry of the address translation buffer and the control register. When a logical address is to be translated to a real address, if there is an entry having a logical address and an address translation table start address equal to the memory request logical address and the address translation table start address of the control register, or an entry having a logical address and a group identifier equal to the memory request logical address and the group identifier of the control register, in the address translation buffer, the real address of the entry is rendered valid and used for memory access.

14 Claims, 1 Drawing Sheet

METHOD AND APPARATUS FOR GENERATING A REAL ADDRESS MULTIPLE VIRTUAL ADDRESS SPACES OF A STORAGE

BACKGROUND OF THE INVENTION

The present invention relates to method and apparatus for translating an address of a computer system which adopts a virtual memory scheme, and more particularly to method and apparatus for controlling multiple virtual spaces suitable for address translation where there is a common area among a portion of the virtual address space in a multiple virtual storage system.

In the computer system of the virtual memory scheme, a memory address is given by an address on a virtual space (that is, a logical address). Accordingly, when a main storage is to be accessed, it is necessary to translate the logical address to an address on the main storage (that is, a real address). The address translation is carried out by looking up an address translation table (usually comprising a segment table and page tables) provided in the main storage. Pairs of logical addresses and real addresses obtained by the address translation are usually registered or stored in an address translation buffer or translation lookaside buffer (TLB), and for the logical address requested for the memory access, the corresponding real address is looked up from the TLB so that the address translation is carried out at a high speed.

On the other hand, in a multi-process multiple virtual storage system, a virtual space is allotted for each job and an address translation table is provided for each virtual space. Switching of virtual spaces due to switching of jobs is carried out under control of an operating system (OS) of a computer system, such as Hitachi VOS3, by rewriting a start address of the address translation table or rewriting a content of an address control register (ATOR) which holds a space identifier. In this case, in addition to the logical address (LA) and the real address (RA), the content (ATO) of the address control register are held in the TLB. When the object real address is to be looked up from the TLB, the coincidence of the corresponding virtual spaces as well as the coincidence of the logical addresses is checked.

In such a multiple virtual storage system, a common area to respective virtual spaces is indicated by adding a common segment bit (C bit) in the TLB. When the C bit is "1" (indicating the presence of the common area), the start address of the address translation table or the space identifier held in the TLB is ignored, and if the logical address from the memory address register and the logical address of the TLB are equal, the corresponding real address is considered valid and the accessing to the main storage is carried out thereby. In the multiple virtual computer system, a computer identifier (CN bit) is set to an area common to the virtual computers, and a pair consisting of a logical address and a real address registered in the TLB is rendered valid by a logical product (AND) condition of the C bit and the CN bit.

This type of virtual space control system is shown in JP-A-60-68443 filed by the assignee of the present application and published on Apr. 19, 1985.

The prior art described above is effective in enhancing a hit rate of the address translation buffer when the common area which is common to all virtual spaces is used, but it does not give consideration to a case where there is a common area among a portion of virtual spaces. When the common area is set for the portion of virtual spaces, the hit rate of the address translation buffer decreases and the number of times of rewriting of the buffer increases. Data in the common area can be readily read from or updated by any virtual space so that security for the data and programs of the respective virtual spaces is not sufficiently assured. Accordingly, the prior art system is hardly applicable to an area which is to be shared by only specified spaces.

SUMMARY OF THE INVENTION

It is an object of the present invention to provide a method and apparatus for controlling address translation of multiple virtual spaces of a multi-process machine which is suitable when a partial common area is shared by a plurality of virtual spaces.

It is another object of the present invention to provide a method and apparatus for controlling address translation of multiple virtual spaces which permits setting of a common area without resulting in decrease of a hit rate of a TLB among specified virtual spaces and which can assure security of data and programs.

In order to achieve the above objects, in accordance with the present invention, a group identifier comprising a plurality of bits for identifying a group of virtual spaces having a partial common area is added to each of entries of an address translation table, entries of an address translation buffer and a control register which holds a start address of the address translation table or a space identifier, and when there is an address translation buffer entry having a coincidence between a virtual address from a memory address register and the start address of the address translation table or the space identifier from the address control register, or there is an address translation buffer entry having a coincidence between the virtual address (LA) from the memory address register and the group identifier (GID) from the address control register, the real address of the address translation buffer entry is considered valid and the main storage is accessed by that real address.

When address translation is carried out for one virtual space under the control of the operating system (OS) of the virtual memory scheme, a virtual address and a real address as well as a current start address of the address translation table or a space identifier and a group identifier added to the entry of the corresponding address translation table are registered into the entry of the address translation buffer. The group identifier comprises a plurality of bits so that it can identify a plurality of predetermined groups of virtual spaces.

In the address translation in other virtual spaces having the same group identifier, if there is an entry having a coincidence between a requested virtual address and the virtual address in the address translation buffer and a coincidence between a group identifier from the address control register and the group identifier in the address translation buffer, the address translation is carried out by the address translation buffer and no new registration is made to the address translation buffer. Accordingly, rewriting of the buffer is not necessary. In the address translation in other virtual spaces having a different group identifier, there is no coincidence between group identifiers nor the start addresses of the address translation tables or space identifiers. Accordingly, the address translation is carried out by looking up the address translation table and the result is registered into the address translation buffer. Thus, even if the virtual addresses are equal, different address translation tables are looked up.

DESCRIPTION OF THE PREFERRED EMBODIMENTS

One embodiment of the present invention is now explained with reference to the accompanying drawings.

Figure 2:
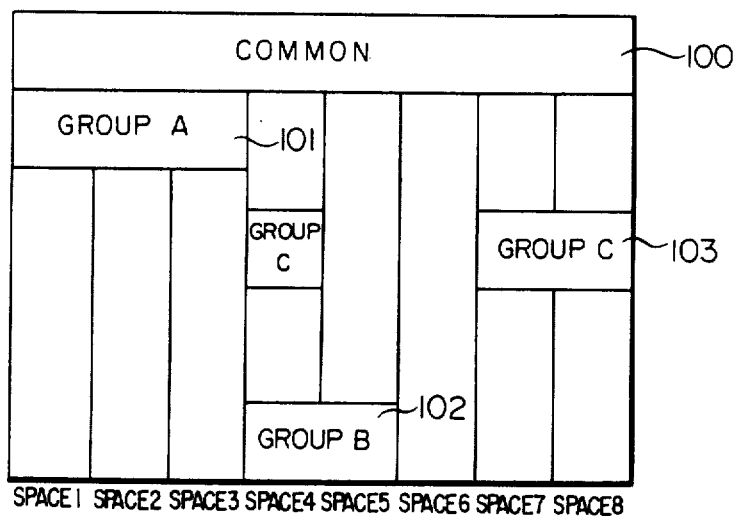
FIG. 2 is a diagram showing an example of a memory map of multiple virtual spaces considered in the present invention.

FIG. 2 shows a memory map of multiple virtual spaces considered in the present invention. In FIG. 2, each of the virtual spaces 1-8 has an area 100 (wholly common area) which is common to all virtual spaces 1-8, as described in the above-referenced JP-A-60-68443. In the present embodiment, the virtual spaces 1-3 have a partial common area 101 (Group A), the virtual spaces 4 and 5 have a partial common area 102 (Group B), and the virtual spaces 4, 7 and 8 have a partial common area 103 (Group C). Hereinafter, an identifier for the wholly common area 100 is called a common segment bit (C), and identifiers for the Groups A, B and C (101-103) are called group ID's (GID's). The GID may comprises eight bits with respective bits corresponding to the spaces 1-8. For the Group A, the bits 1-3 are "1", for the Group B, the bits 4 and 5 are "1", and for the Group C, the bits 4, 7 and 8 are "1". The Groups A, B and C may be identified by codes. In this case, GID may comprise less than eight bits.

Figure 1:
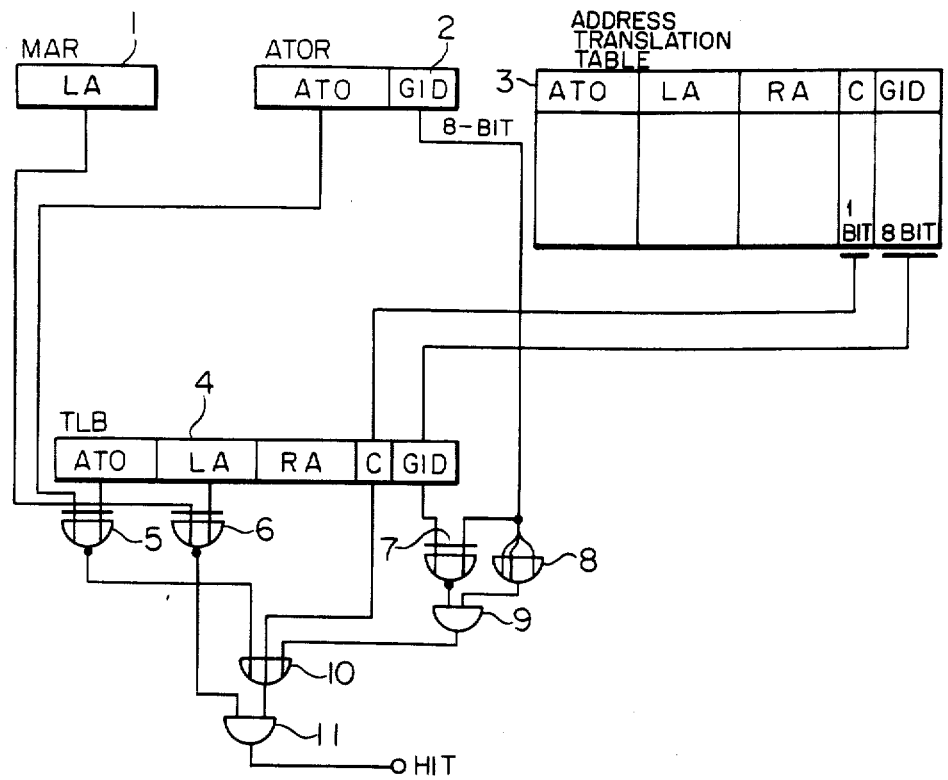
FIG. 1 is a block diagram showing one embodiment of a system configuration of the present invention.

FIG. 1 shows a block diagram of one embodiment of an address translation control system of the present invention. It shows a hit detector of an address translation buffer.

In FIG. 1, a memory address register (MAR) 1 holds a logical address (LA) of a memory access request. An address translation table start address register (ATOR) 2 holds a space identifier or an address translation table start address (ATO) and a group ID (GID) in order to identify a current virtual space. When a virtual space is selected and switched under control of an OS, the space identifier or ATO in the ATOR 2 is updated. In the following description, either the space identifier or the ATO is used in the same manner.

Each entry of the address translation table 3 comprises a real address (RA), a common segment bit (C) and a group ID (GID). The address translation table 3 is provided in a main storage for each virtual space, and a start address thereof is designated by the ATO in the ATOR 2. The address translation table usually comprises a segment table and page tables, but they are shown as one table in the present embodiment for the purpose of simplification.

Each entry of the address translation buffer (TLB) 4 comprises an address translation table start address (ATO), a logical address (LA), a real address (RA), a common segment bit (C) and a group ID (GID). While only one entry is shown, the TLB 4 actually has a plurality of entries and a desired entry is accessed by a predetermined bit such as a start address of the memory address register (MAR) 1. This method is referred to as a set associative address translation buffer control. When the address translation is carried out by using the address translation table 3, the logical address (LA) of the memory address register 1, the ATO (or space identifier) of the ATOR 2, and RA, C and GID of the address translation table 3 are registered into the corresponding entry of the TLB 4.

An exclusive OR circuit (EX-OR) 5 compares the ATO of the ATOR 2 and the ATO of the TLB 4 and produces a logical "1" output when they are equal. An EX-OR 6 compares the logical address of the memory address register 1 and the LA of the TLB 4 and produces a logical "1" output when they are equal. An EX-OR 7 compares the GID of the ATOR 2 and the GID of the TLB 4 and produces a logical "1" output when they are equal. Those EX-OR's produce logical "0" signals when compared inputs are not equal. An OR circuit 8 constitutes detection means for detecting if a virtual space designated by the OS does not belong to any common group and produces a logical "1" output when at least one of the bits of the GID of the ATOR 2 is a significant bit and an input logical signal is "1". An AND circuit 9 produces a logical "1" output when the outputs of both the EX-OR 7 and the OR circuit 8 are "1". An OR circuit 10 produces a logical "1" output when one of the output of the EX-OR 5, the C bit of the TLB 4 and the output of the AND circuit 9 is "1". An AND circuit 11 produces a logical "1" output when the outputs of both of the EX-OR 6 and the OR circuit 10 are "1". The output of the AND circuit 11 is an address translation buffer hit signal HIT. When the signal HIT is "1", the RA of the TLB 4 is rendered valid and the memory is accessed by that real address.

The operation of FIG. 1 is explained with reference to the memory map shown in FIG. 2.

It is assumed that values of the area 101 of the Group A of the virtual space 1 have been registered in the ATO, LA, RA, C and GID of the entries of the TLB 4, and the ATO and GID of the virtual space 2 have been set in the ATOR 2. If the logical address of the memory address register MAR 1 designates an area of the Group A, the EX-OR 6 produces a logical "1" output. Since the ATO of the ATOR 2 and the ATO of the TLB 4 are now not equal, the EX-OR produces a logical "0" output. Since the area 101 of the Group A is not the wholly common area 100, the C bit of the TLB is "0". In this case, if the group ID (GID) has not been set, the OR circuit 10 produces a logical "0" output because the circuits 7-9 produce logical "0" outputs and the AND circuit 11 produces a logical "0" output which indicates that the corresponding logical address does not exist in the TLB (not in TLB).

On the other hand, if values indicating the common Group A to the virtual spaces 1 and 2 (that is, bits 1-3 of the GID are "1") have been set in the GID of the ATOR 2, the outputs of both the EX-OR 7 and the OR 8 are "1" and the OR circuit 10 produces a logical "1" output. As a result, the HIT signal of the AND circuit 11 is "1" indicating that a real address corresponding to the logical address exists in the TLB (in TLB). Thus, the main memory is accessed by using the RA of the TLB 4 as the real address. It is noted that the space 4 included in Group B and Group C is relatively small in the number of reference thereto.

In accordance with the present invention, the address translation can be attained by the same address translation buffer entry for the partially common area in different virtual spaces. Thus, in the set associative address translation buffer control, the number of times of updating of the address translation buffer decreases and the buffer hit rate is enhanced. Further, the accessing to a common area of a group of virtual spaces by a virtual space of another group can be inhibited by setting different group ID's for the respective groups.

We claim:

1. A method of generating a real address in multiple virtual address spaces of a storage having multiple virtual storage spaces, an address translation table for each virtual address space to translate a logical address to a real address, an address control register for storing a start address of the address translation table or a virtual address space identifier, and an address translation buffer capable of storing copies of entries contained in the address translation table, said method comprising the steps of:

providing group identifiers in each of the entries in said address translation table, said address translation buffer and the entry in said address control register for identifying a respective area shared by a specific group of virtual spaces;

determining whether there is at least one entry in the address translation buffer whose logical address and address translation table start address conform with the logical address supplied for a memory request and the address translation table start address in said address control register, or whether an entry exists in the address translation buffer whose logical address and group identifier conform to the logical address supplied for memory access and the group identifier of said address control register; and if there is at least one conformity, identifying the real address of said entry as a valid real address for memory access.

2. A method according to claim 1 wherein the shared areas include a plurality of different areas including a predetermined combination of portions of virtual address spaces smaller in number than the total number of virtual spaces, each of said different areas having a group identifier for identifying the particular area, said areas being independent from one another and non-accessible by each other.

3. A method according to claim 1 wherein the shared areas include an area common to at least one first and one second virtual address space, each virtual address space having a plurality of limited common sub-areas, and data in the common sub-areas being managed by an operating system.

4. A method according to claim 3 wherein said first virtual address space has a higher priority than said second virtual address space.

5. A method according to claim 1 wherein said determining step includes sub-steps of (1) comparing the logical address supplied from a memory address register with the logical address in said address translation buffer to produce a first coincidence signal when they are equal, and comparing the group identifier of said address control register and the group identifier of said address translation buffer to produce a second coincidence signal when they are equal, and (2) determining that the corresponding entry in said address translation buffer is valid when said first coincidence signal and said second coincidence signal are simultaneously present.

6. A method according to claim 5 wherein said second coinciding signal is inhibited when it is detected that the group identifier from said address control register does not belong to any group of virtual address spaces with shared areas.

7. A method according to claim 1 further comprising a step of copying the entry in the address translation table into said address translation buffer if it is found that the corresponding entry does not exist in the address translation buffer.

8. A virtual address space control apparatus in a multiple virtual storage system, comprising:

(a) an address translation table having entries each including a pair of logical and real addresses and a group identifier for identifying storage areas common to specified groups of virtual address spaces, for translating a logical address to a real address under control of an operating system;

(b) an address translation buffer having logical and real address pairs copied from the address translation table, and an associated group identifier and an associated virtual address space identifier for translating a logical address to a real address;

(c) an address control register specifying a virtual address space identifier and a group identifier; and (d) detection means responsive to supply of a logical address for memory access for detecting the presence of entries in the address translation buffer of the kind whose logical address and virtual address space identifier are equal to the logical address supplied for memory access and the virtual address space identifier of said address control register, or for detecting entries of the kind whose logical address and group identifier are equal to the logical address supplied for memory access and the group identifier of said address control register;

said detection means, when the presence of either of said entries is detected, producing a signal for rendering the real address of said address translation buffer valid as a memory accessing address.

9. A control apparatus according to claim 8 wherein said group identifier includes a plurality of bits, while a single bit identifying a common area to all virtual address spaces is provided in said address translation table and in the address translation buffer.

10. A control apparatus according to claim 9 wherein said detection means include means for comparing the logical address supplied for a memory access from a memory address register and the content of the corresponding entry of said address translation buffer to produce a first coincidence signal when they are equal, means for comparing the group identifier of said address control register and the content of the corresponding entry of said address translation buffer to produce a second coincidence signal when they are equal, and select signal producing means responsive to simultaneous occurrence of said first coincidence signal and said second coincidence signal for producing a signal to select the real address of the corresponding entry in said address translation buffer as an address for memory access.

11. A control apparatus according to claim 10 wherein said means for producing the second coincidence signal includes means for inhibiting the second coincidence signal when it is detected that the group identifier from said address control register does not belong to any group of virtual address spaces having common areas.

12. A control apparatus according to claim 10 wherein said detection means further includes means for comparing the control of the output from said address control register and the content of the corresponding entry of said address translation buffer to produce a third coincidence signal when they are equal, said select signal producing means producing a select signal upon the simultaneous occurrence of said first coincidence signal and said third coincidence signal.

13. A control apparatus according to claim 12 wherein said means for producing a select signal responds to simultaneous occurrence of a signal indicating the common area to all virtual address spaces in said address translation buffer and said first coincidence signal.

14. A control apparatus according to claim 8 wherein said virtual address space identifier comprises a start address of said address translation table.

* * * * *